United States Patent Office 3,019,164
Patented Jan. 30, 1962

3,019,164
URETHAN AND 6 AZAURACIL IN
CANCER THERAPY
George H. Hitchings, Tuckahoe, and Samuel Bieber, Mount Vernon, N.Y., assignors to Burroughs Wellcome & Co. (U.S.A.) Inc., Tuckahoe, N.Y., a corporation of New York
No Drawing. Filed Jan. 22, 1957, Ser. No. 635,083
4 Claims. (Cl. 167—65)

This application discloses a new and improved method of using urethan which is comprised of the administration of urethan with 3,5-dihydroxy-1,2,4-triazine (6-azauracil). The two drugs may be administered separately but in many cases it is convenient to administer them simultaneously in one preparation. Such a preparation may contain the two in approximately equal amounts and for many purposes approximately equal weights of the two substances form the most effective combination. However, the actual proportions may be varied widely from as little as one part of azauracil to five of urethan to compositions containing five parts of azauracil to one of urethan. Ordinarily, the dosage range of the composition will fall between one-half and four grams a day given at one to three dosage intervals.

The exact methods of administration of these mixtures will vary as widely as the methods of using urethan itself and in general, it may be stated that the mixtures are to be used like urethan, which is and has been well known in the art for many years. Urethan is used as a hypnotic and has valuable properties in the inhibition of certain strains of bacteria and in its effects on certain insects. It also is useful for its actions on animal neoplastic growths, in particular in the treatment and remission of chronic lymphocytic leukemia and multiple myeloma. In these activities it is potentiated by the simultaneous presence of 6-azauracil. Thus, the synergistic action of 6-azauracil and urethan may be demonstrated in the treatment of mice bearing adenocarcinoma 755, where combinations of doses of the substances which alone had no activity against the tumor produced a strong effect giving complete resorption of the tumors of essentially all of the animals treated—a result superior to that which could be obtained with either substance alone. Similar synergistic action has been shown against bacterial mutants and in hypnosis.

Example 1

The testing of the drugs in mice bearing adenocarcinoma 755 was carried out as follows. Male C57 mice of 18–21 grams body weight were used. Tumor fragments (1–2 mm.³) were implanted into the right axilla by means of a trocar inserted through an inguinal flap. After a period of seven days, during which the tumors were allowed to become established, the animals were sorted into groups of six and treatment was begun. Six doses were administered, one each on days 8, 9, 10, 13, 15 and 17. The experiments were ended twenty-one days after the tumor was implanted. Experimental and control animals were weighed and their tumors were dissected out, weighed and photographed. In determining anti-tumor activity no experiments were used in which there was a body weight loss of greater than 20% in the experimental animals. The degree of tumor inhibition was determined by calculating the ratio of the tumor weights of the experimental animals to those of the control animals. In all such calculations animals in which the tumors were resorbed were included as having a tumor weight of zero. The table which follows presents the results of such experiments with 6-azauracil and urethan alone and in combination.

| | Dose, mg./kg. B.W. | | TWI* | T/N** | Toxicity† | BWI*** |
|---|---|---|---|---|---|---|
| 6-Azauracil (A) | 500 | | 0.01 | 2/14 | 10/24 | 0.95 |
| | 250 | | 0.26 | 12/24 | 0/24 | 0.97 |
| | 125 | | 0.52 | 14/24 | 0/24 | 0.98 |
| | 30 | | 0.97 | 7/10 | 2/12 | 1.03 |
| Urethan (B) | 200 | | 0.08 | 1/4 | 2/6 | 1.14 |
| | 100 | | 0.19 | 5/10 | 2/12 | 0.94 |
| | 50 | | 0.29 | 30/47 | 1/48 | 1.00 |
| | 12.5 | | 0.67 | 7/10 | 2/12 | 1.01 |
| | A | B | | | | |
| A+B | 62.5 | 25 | 0.00 | 0/6 | 0/6 | 0.92 |
| | 30 | 12.5 | 0.00 | 0/12 | 0/12 | 0.98 |
| | 5 | 2 | 0.23 | 2/6 | 0/6 | 1.00 |

*TWI=tumor weight index (ratio of experimental tumor weights/control tumor weight).
**T/N=number of tumors remaining at end of experiment/number of animals.
***BWI=body weight index (ratio of body weight of experimental animals/control animals).
†=number of animals surviving treatment divided by number of animals treated.

It will be observed that the proportions can be varied in the composition and the dosage can vary depending upon the individual case and such changes are contemplated within the scope of the appended claims.

What we claim is:

1. A process which comprises the concurrent administration of from approximately 1 to 5 parts of 6-azauracil and from 1 to 5 parts of urethan whereby the action of the latter is potentiated.

2. A process which comprises the concurrent administration of a quantity of 6-azauracil and a substantially equivalent amount of urethan, whereby the action of the latter is potentiated.

3. A composition comprising from approximately 1 to 5 parts of 6-azauracil and from 1 to 5 parts of urethan.

4. A composition comprising a quantity of 6-azauracil and a substantially equivalent amount of urethan.

References Cited in the file of this patent

Skipper: Cancer Research, February 1951, pages 109–112.
Goldin: Cancer, January 1952, pages 153–160.
J.A.M.A., April 24, 1954, page 1459.
Woods Abstracts, 1956, Proceeding of the American Association for Cancer Research, April 1956, page 158.
Handschumacher: Cancer Research, November 1956, page 965.
Schindler: Science, March 22, 1957, pages 548–549.